United States Patent [19]
Huber et al.

[11] Patent Number: 5,319,888
[45] Date of Patent: Jun. 14, 1994

[54] RANDOM ORBITAL SANDER

[75] Inventors: Paul W. Huber, Lancaster; David G. Heckmiller, Jr., Orchard Park, both of N.Y.

[73] Assignee: Dynabrade, Inc., Clarence, N.Y.

[21] Appl. No.: 976,434

[22] Filed: Nov. 13, 1992

[51] Int. Cl.$^5$ .................................................. B24B 23/00
[52] U.S. Cl. .................................... 51/170 MT; 51/170 T
[58] Field of Search ......... 51/170 MT, 170 R, 170 T, 51/173, 176, 177, 170 TL

[56] References Cited

U.S. PATENT DOCUMENTS

| | | | |
|---|---|---|---|
| 3,785,092 | 1/1974 | Hutchins | 51/170 MT |
| 3,793,781 | 2/1974 | Hutchins | 51/170 TL |
| 4,071,981 | 2/1978 | Champayne | 51/170 MT |
| 4,414,781 | 11/1983 | Overy | 51/170 MT |
| 4,467,565 | 8/1984 | Wallace | 51/170 MT |
| 4,660,329 | 4/1987 | Hutchins | 51/170 MT |
| 4,671,019 | 6/1987 | Hutchins | 51/170 MT |
| 5,125,190 | 6/1992 | Buser | 51/170 T |
| 5,170,588 | 12/1992 | Schaal | 51/170 MT |

Primary Examiner—M. Rachuba
Attorney, Agent, or Firm—Bean, Kauffman & Spencer

[57] ABSTRACT

There is disclosed in connection with a random orbital sander the utilization of improved arrangements for resiliently supporting an air motor, controlling the flow of pressurized air to the motor, and utilizing air exhausted from the motor to withdraw dust from a shroud arranged to collect dust generated incident to operation of the sander. Also disclosed is an alternative dust collecting arrangement, wherein the shroud is connected by a sander mounted duct to a source of vacuum.

26 Claims, 4 Drawing Sheets

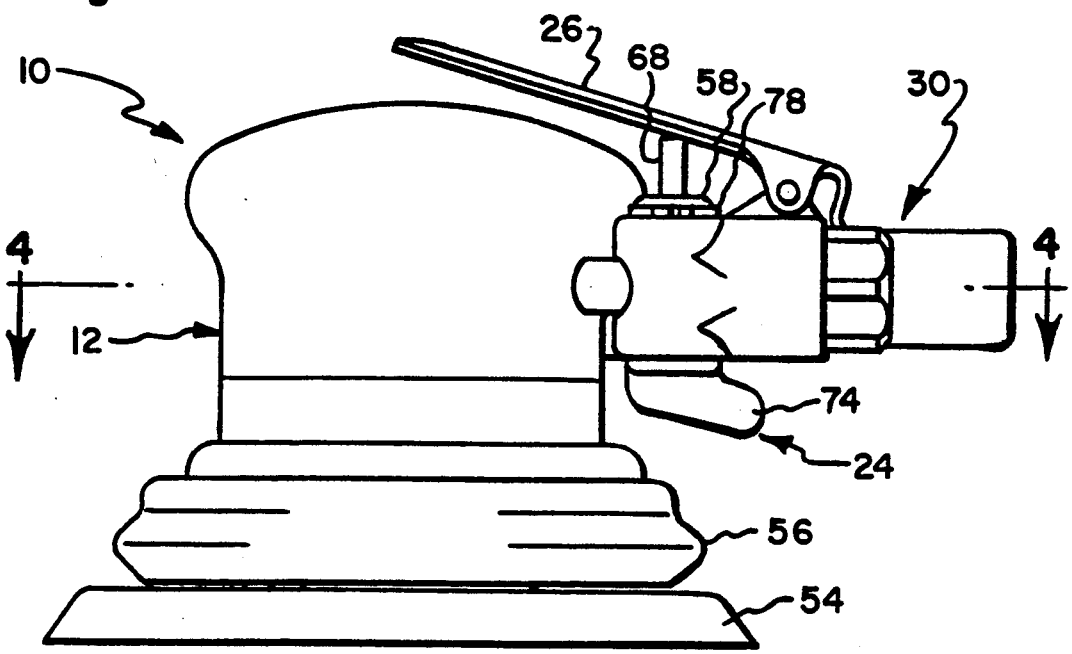
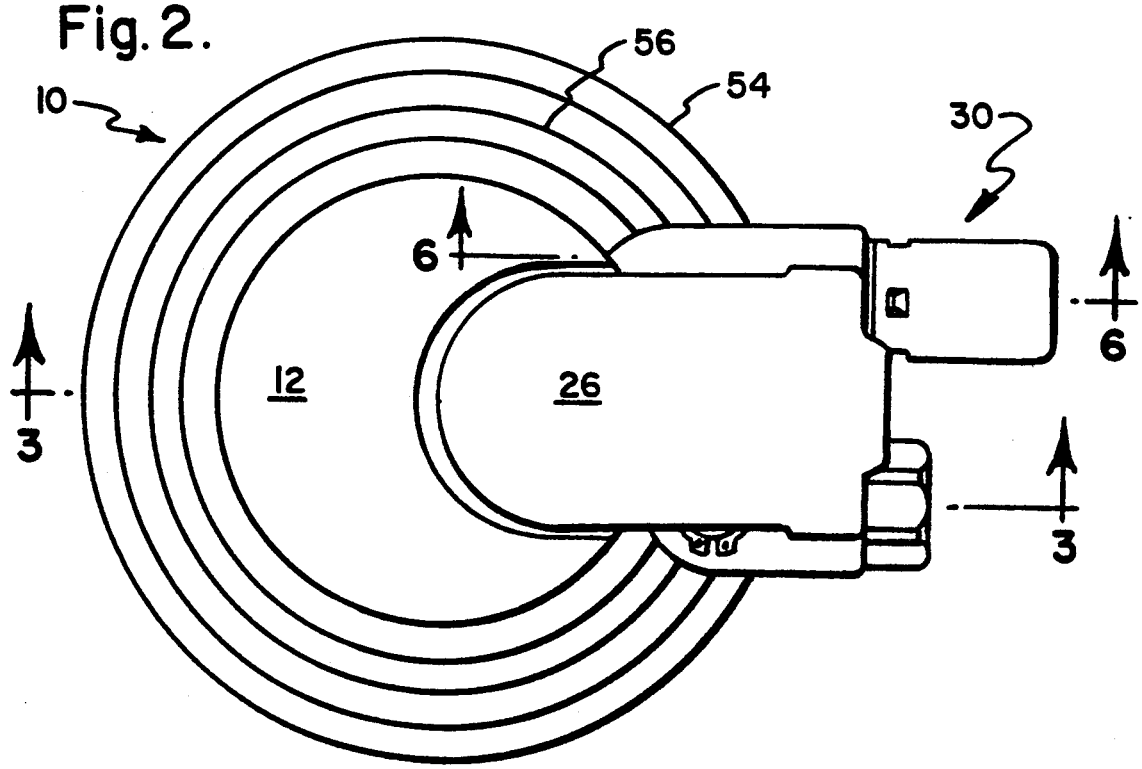

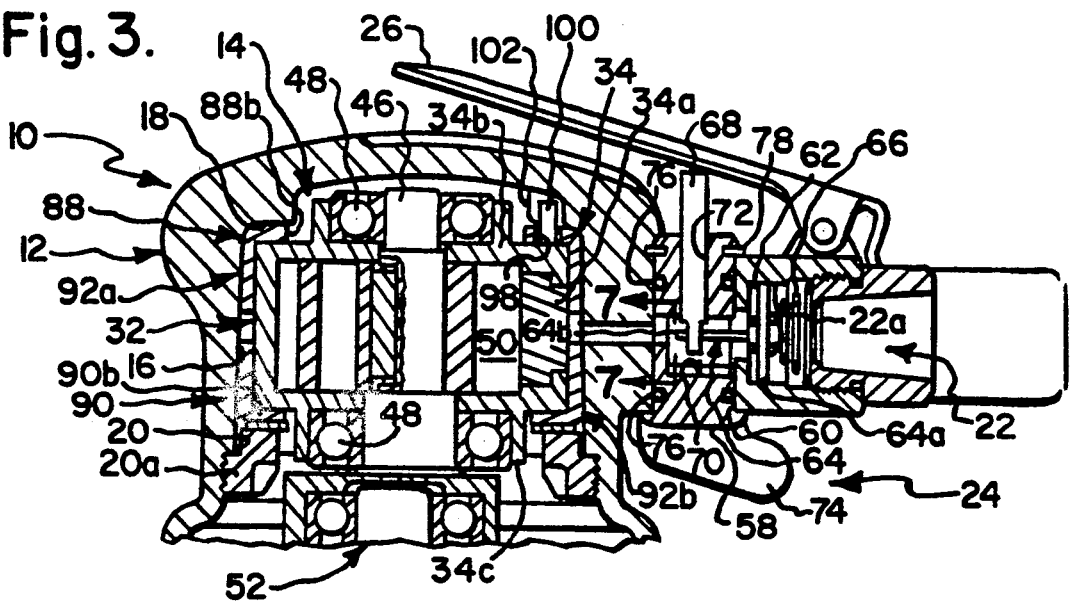
Fig. 3.
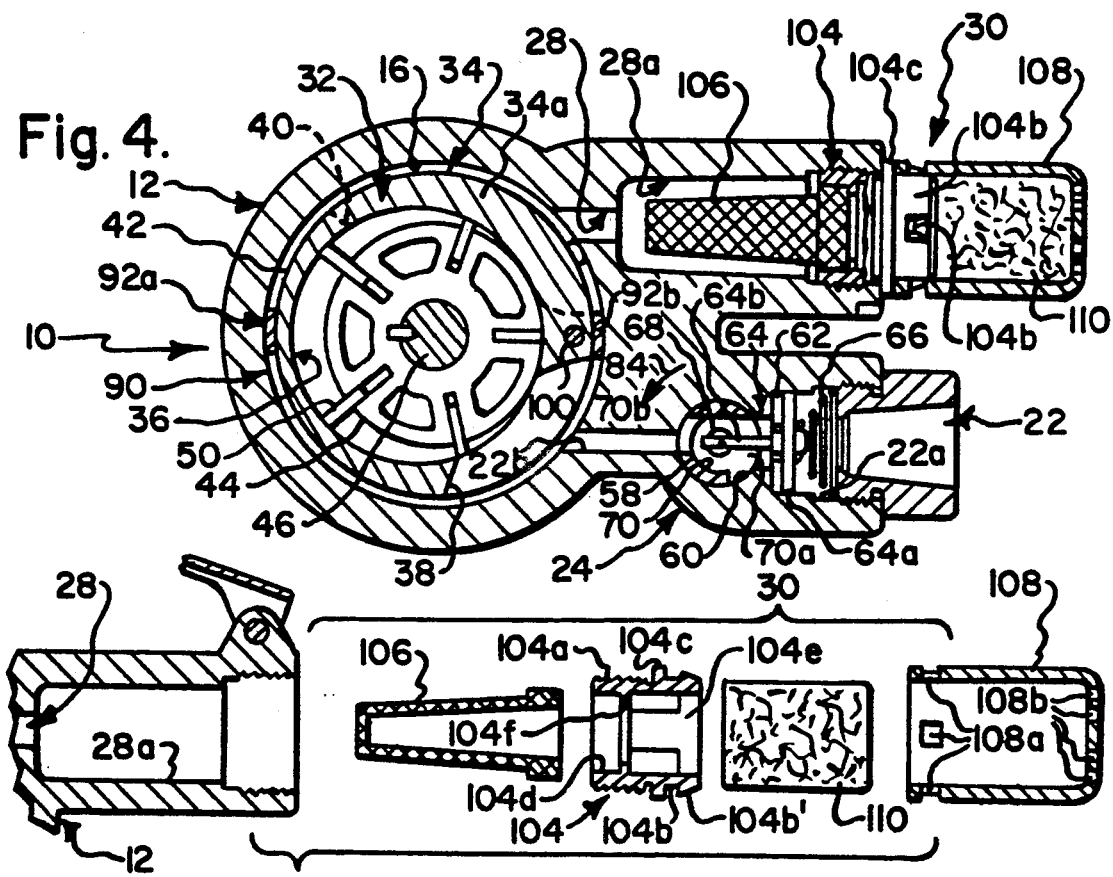
Fig. 4.
Fig. 6.
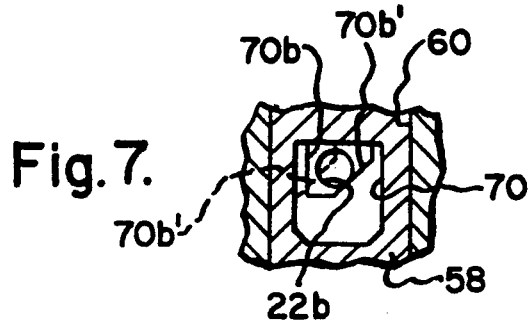
Fig. 7.

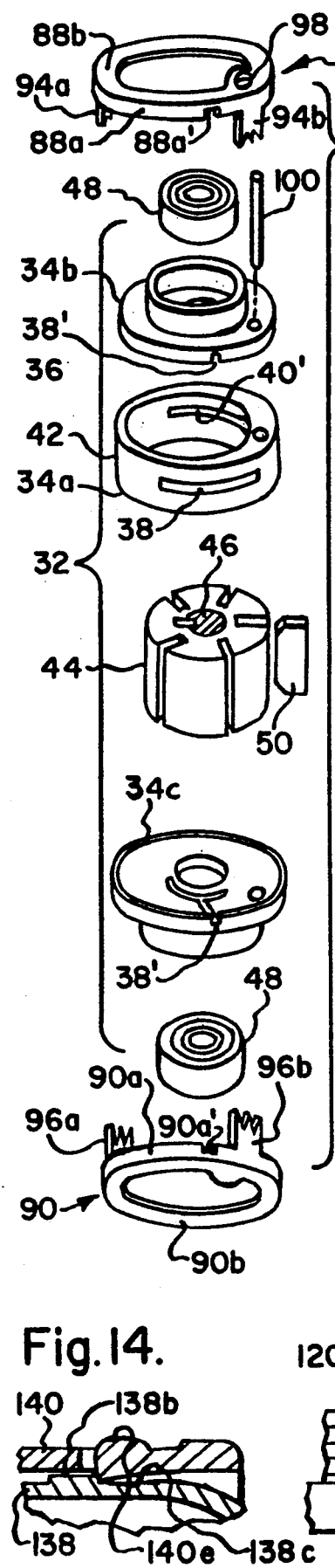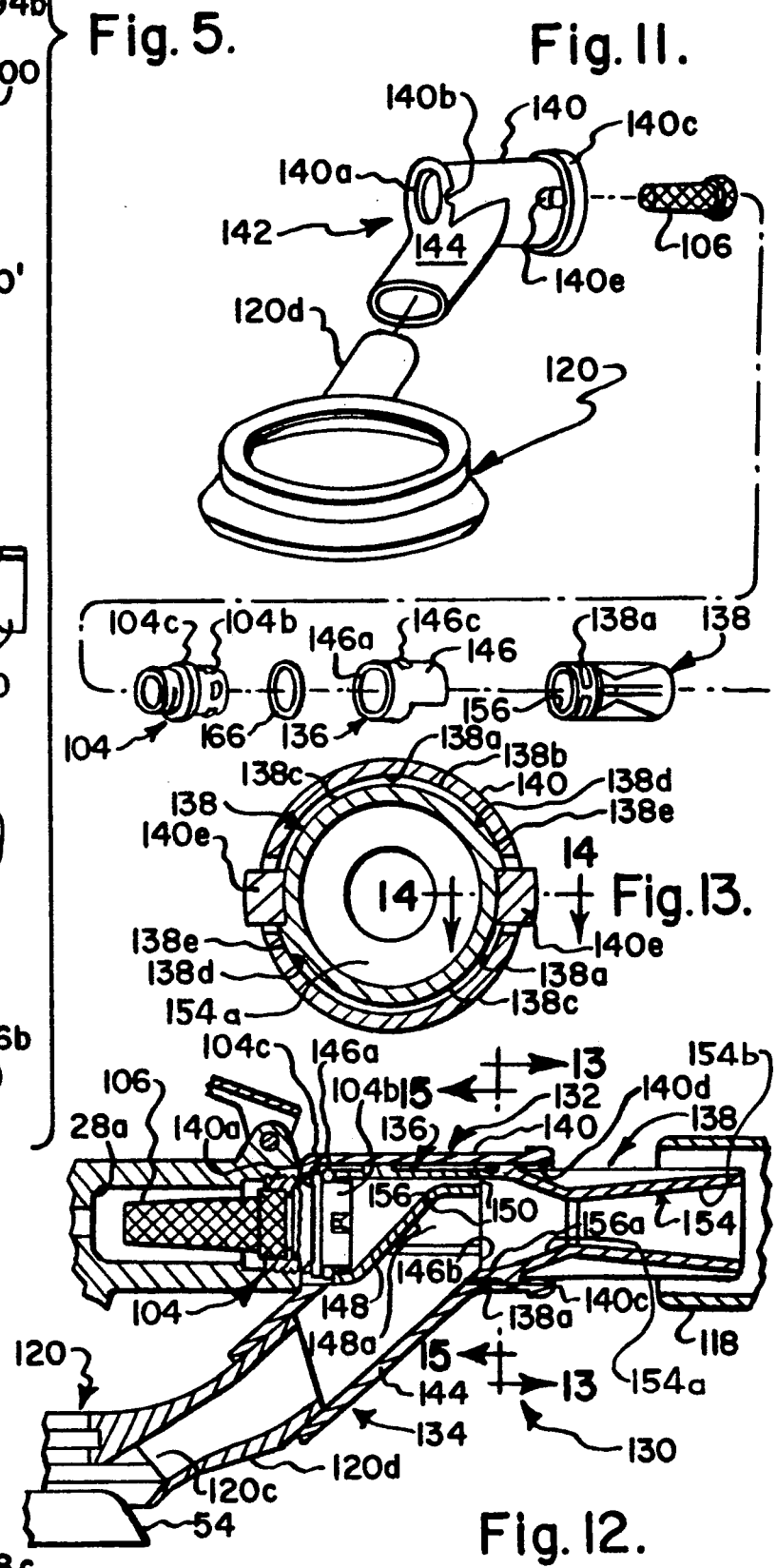

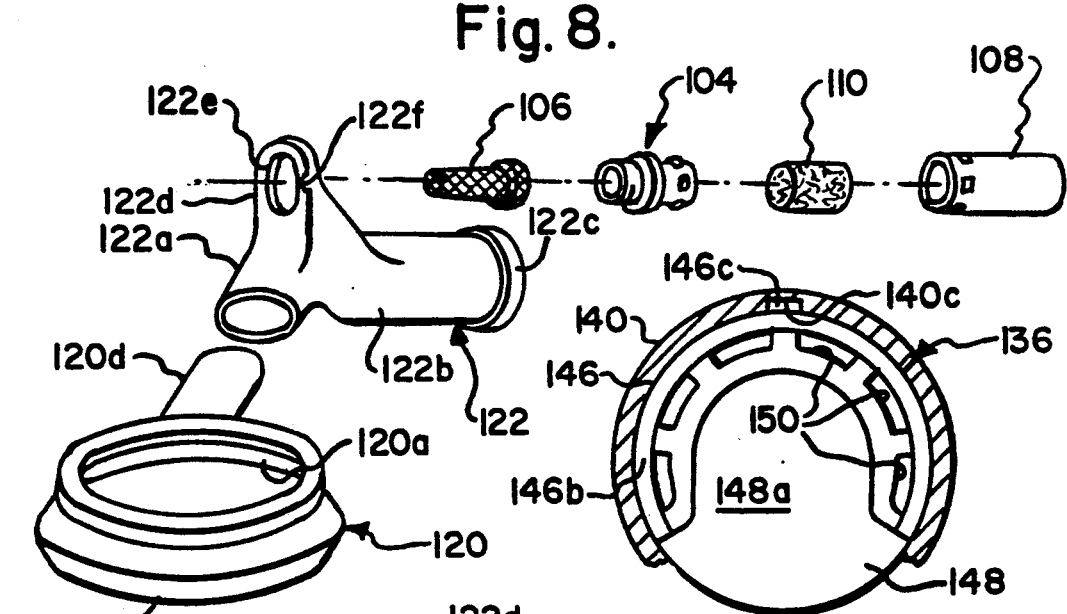
Fig. 8.
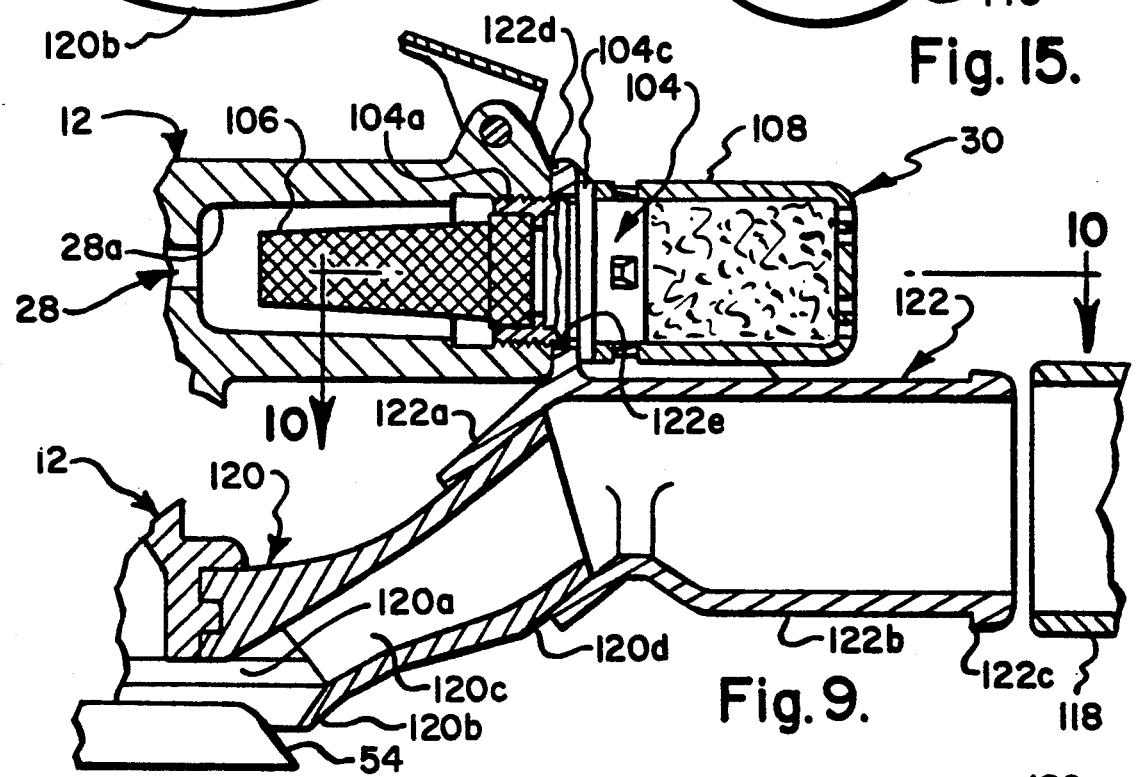
Fig. 15.
Fig. 9.
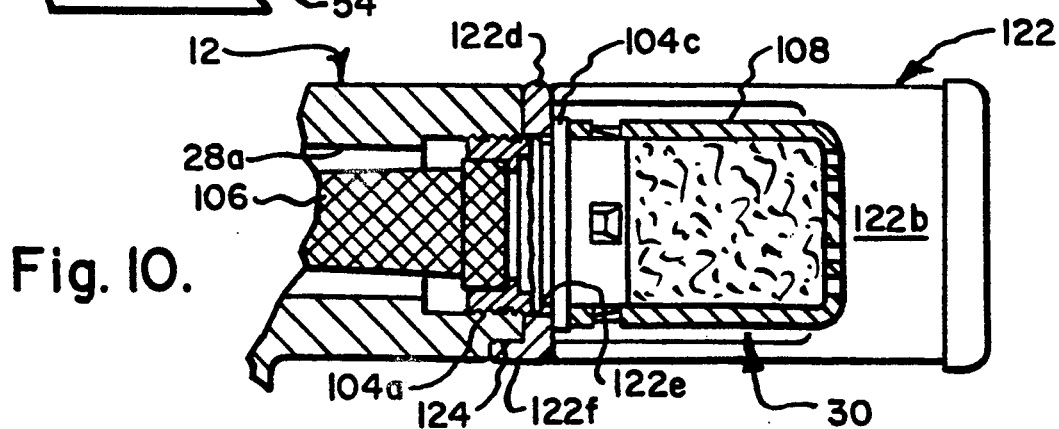
Fig. 10.

RANDOM ORBITAL SANDER

BACKGROUND OF THE INVENTION

Pneumatically operated power tools, such as sanders, are typically formed with a cast or molded housing having a chamber for receiving an air powered motor, air supply and discharge passageways communicating with the chamber through an annular side wall thereof for supplying air to and exhausting air from air supply and discharge ports of the motor, and a chamber for receiving a manually operated valve adapted to control flow of air through the air supply passageway.

In accordance with standard housing casting or molding practice, it is necessary to provide a relief for the side walls of chambers in order to permit withdrawal of chamber forming inserts from the housing at the completion of the casting or molding operation. It has been typical manufacturing practice to bore out motor receiving chambers to remove the relief and accurately size such chambers to frictionally receive a cylindrical side wall of the casing of the motor through which its air supply and exhaust ports extend. A relatively tight fit was required to be provided between the facing side walls of the chamber and motor casing in order to prevent leakage of air annularly within the chamber between the air supply and discharge passageways, and this added greatly to the cost of housing manufacture and motor assembly. An added drawback of this prior manufacturing practice is that vibrations of the motor and/or tool with which it is connected are transferred directly to the housing and from the housing to the operator of the tool.

It has been proposed to resiliently mount air motors within the chamber of an air powered tool by providing a pair of resiliently deformable bands adapted to encircle opposite ends of the motor casing, but in such installations revised motor casing and housing structures are required to permit at least one of the air supply and discharge ports of the motor casing to open axially thereof and at least one of the air supply and discharge passages to open into the chamber in an axial direction.

As with the case of motor receiving chambers, it has been common practice to bore out the valve receiving chambers of air tools to provide for a proper fit with cylindrical rotary valve sleeves, and again this adds to the cost of housing manufacture and valve installation. Another drawback of standard rotary valve constructions employed in air power tools is that they provide for non-linear adjustments of air flow in which slight rotational movements of the valve result in large changes in air flow. As a result, fine adjustments of air flow are difficult for a tool operator to achieve.

Further, various attempts have been made to provide air powered tools, such as sanders, with diverse dust collecting devices. However, prior devices of which we are aware have various disadvantages, which either result in increased tool costs or inefficiencies in the dust collection operation.

SUMMARY OF THE INVENTION

The present invention relates to improvements adapted for use with pneumatically powered tools and particularly adapted for use with tools, such as random orbital sanders, wherein dust is generated as an incident to operation of such tools.

A first aspect of the present invention involves the provision of an arrangement for both resiliently mounting an air powered motor within a chamber of a tool housing and fluid sealing an air inlet port of a casing of the motor and an air supply passageway of the housing relative to an air exhaust port of the motor casing and an air supply passageway of the housing for a tool construction wherein the ports and passageways open through facing wall surfaces of the motor casing and housing chamber. Preferably, the arrangement includes a pair of separately formed, resiliently deformable parts engaging about opposite ends of the motor casing and having integrally formed pairs of sealing projections extending from the parts with the free ends of the projections being engageable to provide seals spaced annularly of the facing wall surfaces of the motor casing and housing chamber and to positionally locate the parts relative to one another. The invention permits mounting of the motor within a chamber of a cast or mold formed tool housing without altering the as-formed frusto-conical configuration of the chamber to correspond to the shape of the side wall of the motor casing.

A second aspect of the invention involves the provision of a uniquely constructed, pressurized air flow control valve for an air tool allowing for a substantially more linear control of air flow through the tool than achievable with prior rotary type flow control valves of which we are aware.

A third aspect of the invention involves an arrangement for collecting dust generated incident to operation of a tool, such as a sander, wherein a dust collecting shroud is connected to a remote vacuum source by a duct removably mounted on a housing of the tool by a muffler through which air is exhausted from the tool.

A fourth aspect of the invention involves an arrangement for collecting dust generated incident to operation of an air powered tool, such as a sander, wherein a dust collecting shroud is arranged in flow communication with a reduced pressure air stream created by an aspirator, which is removably mounted on a housing of the tool and supplied with air exhausted from the tool.

BRIEF DESCRIPTION OF THE DRAWINGS

The nature and mode of operation of the present invention will now be more fully described in the following detailed description taken with the accompanying drawings wherein:

FIG. 1 is a side elevational view of a pneumatically operated, random orbital sander incorporating the present invention;

FIG. 2 is a top plan view thereof;

FIG. 3 is a sectional view taken generally along line the 3—3 in FIG. 2;

FIG. 4 is a sectional view taken generally along line the 4—4 in FIG. 1;

FIG. 5 is an exploded perspective view showing a pneumatic motor incorporated in the sander and resilient support thereof;

FIG. 6 is an exploded sectional view taken generally along the line 6—6 in FIG. 2;

FIG. 7 is a sectional view taken generally along the line 7—7 in FIG. 3;

FIG. 8 is an exploded perspective view of a dust collecting arrangement;

FIG. 9 is a sectional view of the dust collecting arrangement of FIG. 8 in assembled condition;

FIG. 10 is a sectional view taken generally along the line 10—10 in FIG. 9;

FIG. 11 is an exploded perspective view showing a further dust collecting arrangement;

FIG. 12 is a sectional view of the dust collecting arrangement of FIG. 11 in assembled condition;

FIG. 13 is an enlarged sectional view taken generally along the line 13—13 in FIG. 12;

FIG. 14 is an enlarged sectional view taken generally along the line 14—14 in FIG. 13; and FIG. 15 is an enlarged sectional view taken generally along the line 16—16 in FIG. 12.

DETAILED DESCRIPTION

The present invention will now be described for example as being incorporated in a pneumatically driven random orbital sander generally designated as 10 in FIGS. 1-4.

Random orbital sanders typically include a cast or molded housing 12 defining a chamber 14 having a side or boundary wall 16 extending between inner and open outer ends 18 and 20 of the chamber; an air inlet or supply passageway 22 opening through the chamber side wall for supplying pressurized air to the chamber from a suitable source, not shown, under the control of a flow control valve 24 manually operable by a housing mounted lever 26; and an air outlet or discharge passageway 28 opening through the chamber side wall for placing the chamber in communication with the atmosphere via a suitable noise suppressing muffler assembly 30. Mounted within chamber 14 is a pneumatic motor 32 shown generally in FIGS. 3, 4 and 5 as including a motor casing 34 having a side wall portion 34a and opposite or inner wall and outer end wall portions 34b and 34c, which cooperate to define an eccentrically located rotor chamber 36 having air inlet or supply and exhaust or discharge ports 38 and 40, respectively, which open radially through the cylindrical outer surface 42 of side wall portion 34a at points spaced annularly thereof for flow communication with the housing air inlet and outlet passageways, respectively; a rotor 44 supported within the rotor chamber by a motor drive shaft 46 whose outwardly projecting or opposite ends are in turn rotatably supported by bearings 48; and a plurality of rotor vanes 50 slidably carried by the rotor for movement radially of the motor drive shaft. Motor 32 may be retained within chamber 14 by a suitable clamping ring device 20a. Motor drive shaft 46 is coupled via a random orbital drive connection 52 to a suitable sanding disc 54, and a shroud 56 is carried by housing 12 in close proximity to sanding pad 54. The construction of sander 10, as thus far generally described, is conventional.

In accordance with the preferred form of the present invention, the basic construction of sander 10 is modified in respect to the construction and mode of mounting flow control valve 24. Valve 24 is shown in FIGS. 3 and 4 as generally including an axially elongated valve sleeve 58 rotatably received within an open ended valve chamber 60 formed in housing 12 and arranged to extend transversely of and in flow communication with inlet passageway 22, such that the latter is divided into a stepped diameter inlet path 22a and an outlet path 22b; a valve seat defined by a washer 62 mounted within inlet path 22a; a valve member 64; a valve member biasing spring 66; and an operator 68.

Valve sleeve 58 is mold formed to provide a transversely extending through opening 70 having its inlet and outlet ends 70a and 70b arranged for flow communication with the outlet end of flow path 22a and the inlet end of flow path 22b, respectively; an axially extending bore opening 72, which extends through an upper end of the valve sleeve, as viewed in FIG. 3, for communication with through opening 70, and serves to rotatably and slidably support operator 68 intermediate the ends thereof; an enlarged lower end 74 arranged exteriorly of valve chamber 60 for use in manually imparting rotations to the valve sleeve within the valve chamber between first and second limits to be described; a pair of annular recesses vertically bounding the through opening for receiving O-ring seals 76; and an upper annular recess for receiving a C-shaped snap ring 78, which cooperates with lower end 74 to removably retain the valve sleeve within the valve chamber.

Preferably, valve chamber 60 is permitted to retain an as-formed frusto-conical configuration, wherein its upper end is of smaller diameter than its lower end, as viewed in FIG. 3, which results from the requirement for providing a small relief to facilitate withdrawal of a valve chamber forming mold insert from housing 12 at the completion of its casting or mold forming operation. Valve sleeve 58 is mold formed such that its side surface is frusto-conical and has a relief corresponding to the relief of valve chamber 60 in order to facilitate insertion of the valve sleeve and 0-ring seals 76 upwardly into the valve chamber.

Valve member 64 is formed with a sealing end in the form of a valve disc 64a normally maintained in surface-to-surface sealing engagement with washer 62 by spring 66 and an operating end in the form of a pin shaft or stem 64b, which is fixed to disc 64a and extends freely through washer 62 and into through opening 70 via inlet end 70a for pivotal connection with the lower or inner end of operator 68, such as may be provided by forming the lower end of the operator with a slot opening, not shown, sized to loosely receive pin shaft 64b. The upper or outer end of operator 68 is arranged to underengage lever 26.

Be referring to FIG. 3, it will be understood that spring 66 normally serves to maintain valve disc 64a seated against washer 62 in order to block flow of air through inlet passageway 22. As an incident to the seating of valve disc 64a, pin shaft 64b forces operator 68 into its illustrated outwardly extended position. When it is desired to operate sander 10, lever 26 is squeezed or manually depressed, thereby forcing operator 68 to move inwardly of valve sleeve 58 to effect tilting of valve member 64 against the bias of spring 66 sufficiently to unseat valve disc 64a in order to place path 22a in flow communication with path 22b via through opening 70.

The first and second limits of rotational movement of valve sleeve 58 mentioned above are preferably defined by alternative engagement by a pair of abutment surfaces, not shown, defined by enlarged lower end 74 with a fixed abutment, also not shown, formed integrally with housing 12. Valve sleeve 58 is shown as being in its first limited rotational position in FIGS. 3, 4 and 7, wherein through opening inlet end 70a is disposed in unobstructed or full flow communication with the outlet of path 22a and through opening outlet end 70b is in unobstructed or full flow communication with the inlet of path 22b, thereby to provide for a given maximum flow of air through passageway 22 into chamber 14 whenever valve disc 64a is unseated. By manual manipulation of enlarged lower end 74, valve sleeve 58 may be rotated in the direction indicated by arrow 84 in FIG. 4 into its second limited rotational position shown in broken line in FIG. 7, wherein through opening outlet end 70b is annularly displaced relative to the inlet of path 22b, thereby to partially block such inlet and reduce flow of air into chamber 14 to some given minimum value. During rotation of valve sleeve 58 into its second limited rotational position, through opening inlet end 70a remains in unobstructed flow communication with the outlet of path 22a in that such inlet end is required to be relatively large, as shown in FIG. 4, in order to permit rotation of the valve sleeve between its first and second positions without its engaging with pin shaft 64b.

In a presently preferred construction shown in FIG. 7, through opening outlet end 70b is bounded in part by an essentially straight boundary edge 70b' which is inclined relative to the direction of rotation of valve sleeve 58, the inlet of path 22b is of circular cross-sectional configuration, and the boundary edge is arranged to sweep across the inlet of flow path, as valve sleeve 58 is rotated from its first into its second limited rotational position. This construction provides for a substantial more linear variation in the flow of air into the inlet of path 22b than would occur if outlet end 70b were of circular cross-sectional configuration, as is common in rotor flow control valves. The extent of the adjustment of air flow depends upon the extent of rotational displacement of valve sleeve 58 and the length and inclination of boundary edge 70b'.

Further in accordance with the preferred form of the present invention, there is provided a unique arrangement for both resiliently mounting motor 32 within housing chamber 14 and fluid sealing air supply passageway 22 and motor inlet port 38 from air outlet passageway 28 and motor exhaust port 40. More specifically, reference is made to FIGS. 3, 4 and 5, wherein resiliently deformable means for supporting and fluid sealing motor 32 within and relative to chamber 14 is shown as including first and second mounting portions 88 and 90, which peripherally engage with the relatively inner and outer ends of motor casing 34, and a pair of intermediate sealing portions 92a and 92b, which extend between the mounting portions.

As shown in FIGS. 3, 4 and 5, mounting end portions 88 and 90 are in the form of end caps having annular side portions 88a and 90a, which bridge across the joints between motor casing side wall portion 34a and end wall portions 34b and 34c and extend radially between casing 34 and chamber side wall 16 thereby to peripherally fluid seal the motor casing relative to the chamber side wall adjacent chamber opposite ends 18 and 20; and washer-shaped end portions 88b and 90b, which overlie the outer or oppositely facing surfaces of casing end wall portions 34b and 34c and fluid seal same relative to chamber inner end 18 and a motor clamp ring device 20a. As best shown in FIG. 4, sealing portions 92a and 92b extend radially between casing side wall portion 34a and chamber side wall 16 to provide a fluid seal therebetween, and are annularly spaced apart through 180° and arranged to annularly separate or fluid seal air supply passageway 22 and air supply port 38 from air exhaust 28 and air discharge port 40.

Preferably, the resiliently deformable means is formed of separate first and second parts shown in FIG. 5 as defining first and second mounting portions 88 and 90 from which extend integrally formed pairs of sealing projections 94a, 94b and 96a, 96b, which are adapted to cooperate to define sealing portions 92a and 92b. Sealing projections 94a, 94b and 96a, 96b have free ends of generally saw tooth shaped configuration, which are intended to interengage in order to positionally locate mounting portions 88 and 90 relative to one another with the respective pairs of sealing projections disposed in alignment, provide a fluid seal between the ends of the sealing projections, and prevent relative rotation between the mounting portions about the lengthwise extending axis of casing 34. As shown in FIGS. 3 and 5, mounting portion 88 is adapted to be positionally located and constrained against rotation relative to casing 34 by providing end wall portion 88b with an opening 98 sized to slidably receive a casing carried mounting pin 100. Casing 34 is in turn positionally located and constrained against rotation relative to chamber 14 by inserting the free end of mounting pin 100 into a recess 102 formed as a part of housing 12 adjacent chamber inner end 18.

Preferably, as with the case of valve chamber 60, chamber 14 is permitted to retain its as-formed frusto-conical configuration, wherein side wall 16 has a slightly larger diameter adjacent chamber outer end 20 than adjacent chamber inner end 18. When shrinkage problems occur during mold forming of housing 12 resulting in side wall 16 being improperly formed, chamber 14 may be formed undersized and then machined to define the side wall. When chamber side wall 16 is of frusto-conical configuration, it is preferable to mold form mounting portions 88 and 90 such that their outer surfaces have a relief corresponding to the relief of chamber side wall 16 in order to facilitate insertion of motor 32 and its mounting portions into cavity 14.

In order to facilitate initiation of rotation of rotor 44, casing end wall portions 34b and 34c are provided with additional air inlet ports 38', and this requires annular end portions 88a and 90a to be provided with notches or cutouts 88a' and 90a' aligned therewith.

Muffler assembly 30 is shown in FIGS. 4 and 6 as including a muffler body 104, which serves to mount the muffler assembly on housing 12 in association with an enlarged, partially screw threaded outlet end 28a of air outlet passageway 28; a muffler cone 106 of molded porous metal construction; a muffler end cap 108; and a muffler end cap insert 110 of fibrous material. Muffler body 104 is in the general form of a sleeve having an outer surface formed with a first or assembly mounting end 104a threaded for removable mounting within passageway outlet end 28a, a generally cylindrical second or muffler cap mounting end 104b formed with a plurality of upstanding mounting tabs 104b' and an intermediate radially outwardly extending annular abutment flange 104c; and an inner surface formed with a cylindrically shaped first end 104d sized to frictionally receive muffler cone 106, a non-round second end 104e for receiving a tool, not shown, adapted for use in removably threading the muffler body into passageway outlet end 28a, and an intermediate radially inwardly extending annular flange 104f. Muffler end cap 108 is of flexible plastic construction and formed adjacent its mouth with a plurality radially extending through openings 108a for use in snap-fit receiving mounting tabs 104b' and adjacent its base with a plurality of air exhaust openings 108b.

FIGS. 8-10 show an arrangement for collecting dust generated incident to operation of sander 10 by use of a suitably remotely located source of vacuum having a flexible hose connection 118. In this arrangement, conventional shroud 56 is replaced by dust collecting shroud 120 shaped to define a dust collecting chamber 120a having a downwardly facing inlet bounded by an annular lip 120b sized and arranged to extend freely about the periphery of sanding pad 54, and a chamber discharge port 120c bounded by an elongated discharge duct 120d; and a separately formed duct 122 is employed to connect discharge port 120c to hose connection 118. Duct 122 is formed with a first end 122a sized to slidably receive discharge duct 120b, a second end 122b having an annular rib 122c for use in coupling the duct to hose connection 118, and an intermediate mounting portion in the form of a transversely extending mounting flange 122d shaped to define a mounting opening 122e and a detent 122f.

As best shown in FIGS. 9 and 10, flange opening 122e is sized to freely receive first end 104a of muffler body 104, which when screwed into outlet end 28a of air outlet passageway 28 effects clamping of mounting flange 122d between housing 12 and muffler body abutment flange 104c. Detent 122f is arranged for receipt within a housing recess 124 in order to properly locate duct 122 relative to housing 12 and constrain the duct from rotation about an axis aligned with flange opening 122e.

Shroud 120 is preferably mold formed of resiliently deformable plastic material such as will allow it to be snap-fit mounted on housing 12 in the manner indicated in FIG. 9, and duct 122 is preferably mold formed of a relatively rigid plastic material to facilitate its connection to discharge duct 120d and hose connection 118 and its mounting on housing 12. The illustrated mode of removably connecting duct 122 to hose connection 118 is conventional, and any suitable means may be employed in place thereof.

FIGS. 11-15 show an arrangement for collecting dust generated incident to operation of sander 10 by making use of air discharged therefrom. In this arrangement, use may be made of previously described shroud 120, muffler body 104 and muffler cone 106 in combination with a uniquely designed aspirator 130 supplied with air discharged from sander 10 through passageway 28.

Aspirator 130 generally includes a first portion 132 making use of air discharged by sander 10 for creating a reduced pressure stream of air and a second portion 134 forming a flow passage for connecting discharge port 120c of shroud 120 to such stream of air for purposes of drawing dust from the shroud. More specifically, first portion 132 includes a nozzle 136 and a tubular member 138, which are removably, slidably fixed within opposite ends of a first part or tubular leg 140 of a generally V-shaped, hollow housing 142 having a second part or tubular leg 144, which is disposed in flow communication with first part 140 and serves to define second portion 134. Housing first part 140 has a first or mounting end formed with an annular mounting flange 140a and a positioning detent 140b, and a second or discharge end formed with an annular rib 140c for use in coupling housing first part 140 to hose connection 118.

Nozzle 136 includes a generally tubular wall portion 146 having an open first or inlet end 146a sized to slidably receive end 104b of muffler body 104 and a second or discharge end 146b; and a generally concave, inclined flow directing wall portion 148, which joins with tubular wall portion 146 intermediate ends 146a and 146b and cooperates with end 146b to define a plurality of nozzle discharge apertures in the form of arcuate slots 150. Slots 150 have their radially outer edges disposed essentially in alignment with the inner surface of tubular wall portion 146, and are arranged to direct exhaust air in a direction extending axially of housing first part 140. Nozzle 136 is constrained against rotation within housing first part 140 by means of a detent 146c, which extends radially outwardly of tubular wall portion 14 and is slidably received within a key slot 140d extending lengthwise of the inner surface of the housing first part.

Tubular member 138 defines an axially extending convergent/divergent flow passage 154 having a cylindrically shaped inlet end 156 arranged to receive air exhausted from discharge slots 150, a convergent portion 154a extending from inlet end 156 and a divergent portion 154b extending from convergent portion 154a, as best shown in FIG. 12. Member 138 is disposed within first part 140 for end abutting engagement with end 146b of nozzle side wall portion 146 and to position the cylindrical surface 156a of its inlet end 156 in alignment with the radially outer edges of discharge slots 150, such that exhaust air discharged from such slots flows parallel to and in engagement with a portion of the peripheral extent of surface 156a before entering the convergent portion 154a of flow passage 154. The stream of exhaust air defined by slots 150 and the portion of the peripheral extent of inlet end surface 156a with which it engages are of arcuate configuration when viewed in cross-section.

As viewed in FIG. 12, the concave outer surface 148a of wall portion 148 is seen as converging towards the stream of exhaust air discharged from slots 150 at an angle of about 135° and as being generally aligned with or following the contour of the inner surface of housing second part 144, whereby these elements cooperate to direct dust laden air from shroud exhaust port 120 into inlet end 156 of convergent/divergent flow passage 154 at an angle relative to the axially extending stream of reduced pressure air created by nozzle 136 and member 138. This angle may be varied, but it must be greater than 90° and less than 180°.

Now referring to FIGS. 12-14, it will be apparent that member 138 is removably snap-fit mounted within housing first part 140 by means of a pair of resiliently deformable detents 140e, 140e formed integrally with the housing first part and a pair of arcuate abutment surfaces 138a, 138a, which extend radially between an outer guide surface 138b and a pair of inner guide surfaces 138c, 138c of the member arranged adjacent inlet end 156 of its flow passage 154. One end of each inner guide surface 138c is formed with an inclined cam surface 138d and adjacent ends of the recesses are separated by a connecting portion of outer guide surface 138b, which is designated as 138e.

Detents 140e, 140e normally project radially inwardly of housing first part 140, such that they resiliently snap-fit into radial lapping engagement with abutment surfaces 138a, 138a, as an incident to insertion of member 138 into housing first part 140, and thereafter latch the member in inserted position. However, subsequent removal of member 138 may be effected by rotating the member in a counterclockwise direction, as viewed in FIG. 13, sufficiently to move cam surfaces 138c, 138c into underlying camming engagement with detents 140e, 140e in order to force the latter to move outwardly of the inner surfaces 138c, 138c into engagement with connecting portions 138e, 138e of member outer guide surface 138b, and thus free the member for withdrawal from housing first part 140.

Aspirator 130 is assembled by placing the O-ring seal 166 on muffler body 104 and then inserting the muffler body within housing first part 140 and threading the muffler body into threaded outlet end 28a of passageway 28 sufficiently to effect clamping of housing first part mounting flange 140a between housing 12 and abutment flange 104c with housing first part detent 140b being inserted into housing recess 124 to constrain the aspirator from rotation relative to housing 12. Nozzle 136 is then slidably inserted into the housing first part until it slidably receives muffler cap mounting end 104b and abuts against the O-ring seal. Thereafter, assembly is completed by slidably inserting member 138 into housing first part 140 for abutting engagement with nozzle 136 to slightly compress O-ring seal 166 and to releasably latch detents 140e, 140e against abutment surfaces 138c, 138c; slidably inserting discharge duct 120d into housing second part 144; and connecting housing first part 140 to house connection 118. Inasmuch as the mode of mounting member 138 permits its discharge end to project outwardly of housing first part 140, it is possible to connect the member directly to a suitable dust collector, not shown, as opposed to connecting the housing first part to a hose connection leading to a vacuum source.

Although having described the invention with specific reference to its use with an air powered random orbital sander, it will be appreciated that various aspects of the invention may be used in other tools. Moreover, the invention is not limited to air operated tools, and thus, the term air is meant to include any suitable pressurized gas. Still further, it is contemplated that the motor mounting arrangement and flow control valve of the present invention may be used in environments where a pressurized liquid is employed in place of a compressible gas.

What is claimed is:

1. A sander comprising in combination:
   a housing defining a chamber having a side wall, an inner end and an open outer end, and an air supply and air exhaust passageways communicating with said chamber at points spaced annularly of said side wall intermediate said ends;
   an air motor disposed within said chamber and having a motor casing and a rotor rotatably supported within said casing, said casing having opposite ends, a side wall and air inlet and exhaust ports spaced annularly of said side wall thereby and arranged intermediate said opposite ends thereof;
   a sanding head;
   means for coupling said sanding head to said rotor for imparting sanding movement to said sanding head in response to rotational movements of said rotor; and
   mounting means for non-rotatably mounting said casing within said chamber to arrange said air inlet and exhaust ports for flow communication with said air supply and air discharge passageways, respectively, said mounting means including resiliently deformable means having mounting portions encircling said opposite ends of said casing and extending radially between said side wall of said casing and said side wall of said chamber adjacent said inner and outer ends of said chamber and a pair of intermediate sealing portions extending between said mounting portions in engagement with said side walls of said chamber and said casing and being spaced apart annularly of said side wall of said casing to fluid seal said air inlet port and said air supply passageway from said air discharge port and said air discharge passageway.

2. A sander according to claim 1, wherein said mounting portions are separately formed and each have a pair of sealing projections formed with free ends, the pairs of said sealing projections of said mounting portions having said free ends disposed in engagement and cooperating to define said pair of intermediate sealing portions.

3. A sander according to claim 1, wherein a mounting pin extends from one of said ends of said motor casing for engagement with said housing to positionally locate said casing within said chamber and arrange said air inlet and exhaust ports for flow communication with said air supply and air discharge passageways, said mounting portions are separate end caps each having a pair of sealing projections extending therefrom and terminating in free ends, one of said end caps having an opening extending therethrough for receiving said mounting pin, and said free ends interengaging to locate the other of said end caps relative to said one of said caps and prevent rotation therebetween about an axis extending lengthwise of said casing.

4. A sander according to claim 1, wherein said side wall of said casing is cylindrical and said side wall of said chamber is of frusto-conical configuration with said outer end having a diameter greater than said inner end.

5. A sander according to claim wherein said sander additionally includes valve means having:
   a valve chamber defined by said housing and arranged to divide said air supply passageway into an inlet flow path and an outlet flow path communicating with said valve chamber;
   a valve seat arranged in one of said inlet and outlet flow paths;
   a valve sleeve supported for rotation within said valve chamber and having a through opening provided with opposite ends arranged for placing said flow paths in flow communication;
   a valve member having sealing and operating ends, said sealing end being arranged within said one of said flow paths for removable engagement with said valve seat for selectively blocking and unblocking flow of air through said one of said flow paths, said operating end extending into said valve chamber from said one of said flow paths and through one of said opposite ends of s id through opening for receipt within said valve sleeve;
   an operator supported by said valve sleeve for engagement with said operating end of said valve member within said through opening and being movable relative to said valve sleeve to effect movement of said valve member for removably engaging said sealing end with said valve seat to selectively block and unblock flow of air through said one of said flow paths, said through opening including said one of said opposite ends thereof being sized and shaped to permit said movement of said valve member and rotation of said valve sleeve within said valve chamber between first and second limits, and another of said opposite ends of said through opening cooperating with another of said flow paths to form a rotary valve for varying flow of air between said through opening and said other of said flow paths incident to rotation of said valve sleeve between said limits.

6. A sander according to claim 5, wherein said rotary valve provides for a substantial linear variation in said flow of air incident to said rotation of said valve sleeve.

7. A sander according to claim 6, wherein an inlet end of said other of said flow paths is of a generally circular cross-sectional configuration and said other of said opposite ends of said through opening has an essentially straight boundary edge inclined relative to the direction of said rotation of said valve sleeve between said limits, said boundary edge cooperating with said inlet end of said other of said flow paths to provide said variation incident to rotation of said valve sleeve.

8. A sander according to claim 5, wherein spring means is disposed within said one of said flow paths to normally bias said sealing end of said valve member into engagement with said valve seat for blocking flow of air through said one of said flow paths.

9. A sander according to claim 5, wherein said valve chamber and said valve sleeve have aligned end openings, and said operator is slidably and rotatably supported by said end opening of said valve sleeve and has an inner end engaging with said operating end of said valve member and an outer end arranged to extend through said end opening of said valve chamber and be accessible from exteriorly of said housing.

10. A sander according to claim 5, wherein said valve chamber and said valve sleeve are of frusto-conical configuration.

11. A sander according to claim 5, wherein said valve chamber has opposite ends opening exteriorly of said housing, said valve sleeve has one end thereof formed with an opening aligned with one of said opposite ends of said chamber for slidably and rotatably supporting said operator, said operator has an inner end engaging with said operating end of said valve member and an outer end arranged to extend through said one of said opposite ends of said chamber and be accessible from exteriorly of said housing, and said valve sleeve has another end thereof aligned with another of said opposite ends of said valve chamber and is accessible from exteriorly of said valve housing for imparting said rotation to said valve sleeve.

12. A sander according to claim 11, wherein said valve sleeve is insertable into said valve chamber through said other of said opposite ends thereof, and latch means is provided to engage with said one end of said valve sleeve and said housing for removably retaining said valve sleeve within said valve chamber, and said valve chamber and said valve sleeve are of frusto-conical configuration with said one of said opposite ends of said valve chamber and said one end of said valve sleeve being of smaller diameter than said other of said opposite ends of said valve chamber and said other end of said valve sleeve.

13. A sander according to claim 1, wherein said sander additionally includes a shroud arranged adjacent said sanding head for receiving dust generated incident to operation thereof, said shroud having a discharge port from which dust may be withdrawn; a duct for connecting said shroud discharge part to a source of vacuum and having a mounting portion; and a muffler connected to said housing for receiving air discharged from said sander through said air exhaust passageway, and said muffler mounting said mounting portion on said housing.

14. A sander according to claim 13, wherein said mounting portion has an opening extending therethrough, said muffler removably mounts said mounting portion on said tool with said opening in alignment with said exhaust passageway and said muffler, and said mounting portion and said housing have removable engaging means for constraining rotation of said mounting portion about an axis aligned with said opening.

15. A sander according to claim 13, wherein said shroud has an integrally formed discharge duct bounding said discharge port, said duct is removably connected to said discharge duct, said mounting portion is a mounting flange having an opening extending therethrough and a detent, said muffler removably clamps said mounting flange against said housing with said opening in alignment with said exhaust passageway, and said housing includes means removably engaging with said detent for constraining rotation of said mounting flange relative to said housing about an axis aligned with said opening.

16. A sander according to claim 1, wherein said sander additionally includes:
  a shroud arranged adjacent said sanding head for receiving dust generated incident to operation thereof, said shroud having a dust discharge port through which dust may be withdrawn, and
  an aspirator for withdrawing dust through said dust discharge port, said aspirator having a first portion connected to said exhaust passageway for creating a reduced pressure stream of air from air exhausted from said housing through said exhaust passageway and a second portion for connecting said dust discharge port to said reduced pressure stream for drawing dust from said shroud.

17. A sander according to claim 16, wherein said first portion includes a nozzle means arranged to receive air from said exhaust passageway and to direct air exhausted from said nozzle means for flow in a given direction and means defining a convergent/divergent through flow passage arranged in alignment with said given direction and having an inlet end arranged to receive said air exhausted from said nozzle means, a convergent portion extending from said inlet end and a divergent portion extending from said convergent portion, and said air exhausted from said nozzle means is directed to enter said flow passage only adjacent a portion of the peripheral extent of said inlet end thereof, and said second portion connects said dust discharge port to said inlet end.

18. A sander according to claim 17, wherein said air exhausted from said nozzle means and said portion of said peripheral extent of said inlet end of said flow passage are of arcuate configuration when viewed in cross-section.

19. A sander according to claim 18, wherein a dust flow directing surface converges towards said stream of air in said given direction and towards said inlet end.

20. A sander according to claim 19, wherein said dust flow directing surface is concave when viewed in cross-section.

21. A sander according to claim 20, wherein said second portion includes a dust discharge flow passage positioned to cooperate with said dust flow directing surface to direct dust into said inlet end of said flow passage in a direction forming an angle of greater than 90° and less than 180° relative to said given direction.

22. A sander according to claim 1, wherein said sander additionally includes:
  a shroud arranged adjacent said sanding head for receiving dust generated incident to operation of said sanding head, said shroud having a dust discharge port through which dust may be withdrawn;

a nozzle communicating with said air exhaust passageway for discharging exhaust air in a given direction;

means having a convergent/divergent through passage, said through passage having an inlet end arranged adjacent said nozzle for receiving said exhaust air with said exhaust air being directed to engage with only a portion of the periphery of a surface of said through passage bounding said inlet end, a convergent portion extending from said inlet end and a divergent portion extending from said convergent portion; and flow passage means communicating at opposite ends thereof with said dust discharge port and said inlet end.

23. A sander according to claim 22, wherein said portion of the periphery of a surface of said through passage and said exhaust air as discharged from said nozzle have generally arcuate cross-sectional configurations.

24. A sander according to claim 22, wherein a flow directing surface is arranged to converge towards said exhaust air discharged from said nozzle in a said given direction, and said flow directing surface cooperates with said flow passage means to direct dust into said inlet end.

25. A sander according to claim 24, wherein said portion of the periphery of a surface of said through passage and said exhaust air discharged from said nozzle have generally arcuate cross-sectional configurations and said flow direction surface has a concave cross-sectional configuration.

26. A sander according to claim 25, wherein said nozzle is removably attached to said housing and said flow passage means is removably attached to said shroud.

* * * * *

UNITED STATES PATENT AND TRADEMARK OFFICE
CERTIFICATE OF CORRECTION

PATENT NO. : 5,319,888
DATED : June 14, 1994
INVENTOR(S) : Paul W. Huber et al

It is certified that error appears in the above-identified patent and that said Letters Patent is hereby corrected as shown below:

Col. 8, line 5 - "14" should be --146--.

Col. 9, line 47 - "thereby" should be --thereof--.

Col. 10, line 48 - "s id" should be --said--.

Col. 11, line 60 - "part" should be --port--.

Col. 10, line 29 - after "claim", insert --1--.

Signed and Sealed this

Seventeenth Day of January, 1995

BRUCE LEHMAN

Attest:

Attesting Officer

Commissioner of Patents and Trademarks